(12) United States Patent
Amano et al.

(10) Patent No.: US 6,292,074 B1
(45) Date of Patent: Sep. 18, 2001

(54) SWITCH UNIT

(75) Inventors: Tsutomu Amano; Mitsuhiro Hanaoka; Kazuhiro Ohta; Atsushi Shimizu, all of Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 0 days.

(21) Appl. No.: 09/534,993

(22) Filed: Mar. 27, 2000

(30) Foreign Application Priority Data

Mar. 31, 1999 (JP) .................................. 11-093046
Jul. 19, 1999 (JP) .................................. 11-204340

(51) Int. Cl.⁷ .............................. H01H 1/66; H01H 51/00
(52) U.S. Cl. ......................... 335/151; 335/202; 335/205
(58) Field of Search ..................... 335/151–154, 335/205–208, 202; 174/52.1, 53, 54, 59, 61; 200/293, 295, 300

(56) References Cited

U.S. PATENT DOCUMENTS 4,409,577 * 10/1983 Holce et al. ..................... 335/202

FOREIGN PATENT DOCUMENTS 4-325362   11/1992   (JP) .
7-220817   8/1995   (JP) .

* cited by examiner

*Primary Examiner*—Ramon M. Barrera
(74) *Attorney, Agent, or Firm*—McGuireWoods LLP

(57) ABSTRACT

A reed switch unit 44 for detecting a liquid level in a reservoir 30 of a master cylinder which comprises a reed switch 11 including a contact part 14 which is sealingly contained in a glass tube 16, and lead portions 18, 18 which axially extend from opposite ends of the glass tube 16, and a unit body 45 provided with terminals 50 for respectively supporting the lead portions 18, 18 so as to be electrically connectable thereby to fix the reed switch 11. The lead portions 18 and the terminals 50 are connected with each other by means of a resistance welding. Accordingly, it is possible to provide a reed switch unit which is improved in quality as well as enhanced in productivity, by mounting a reed switch on a unit body without conducing soldering.

15 Claims, 13 Drawing Sheets

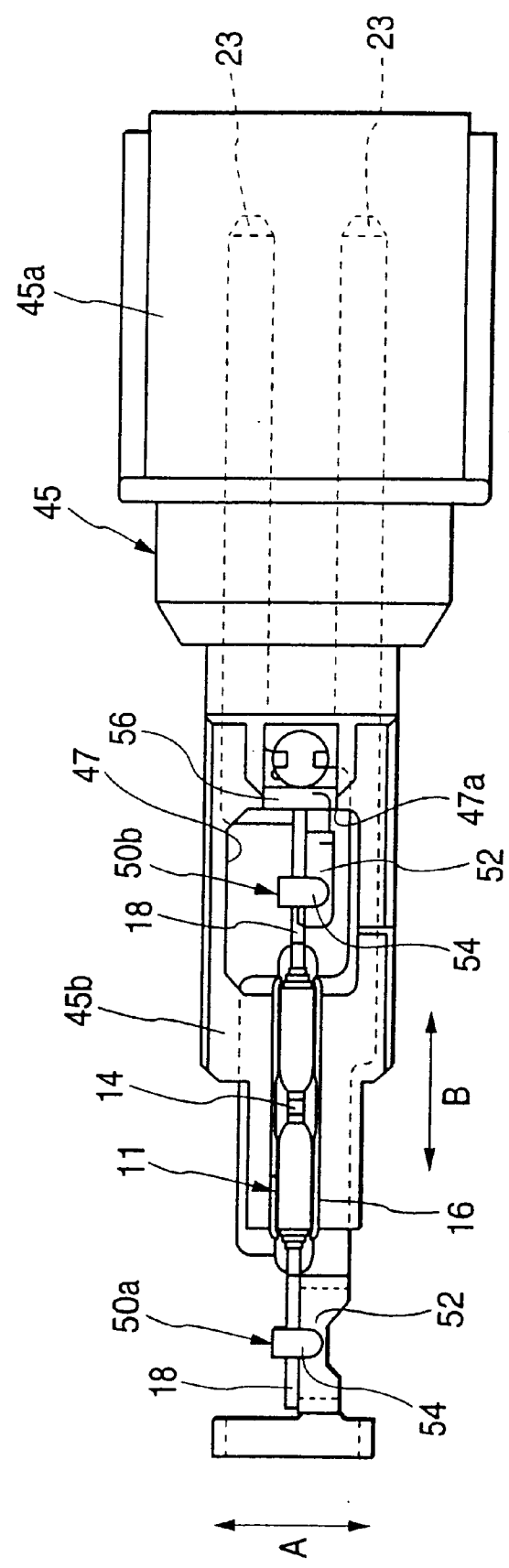

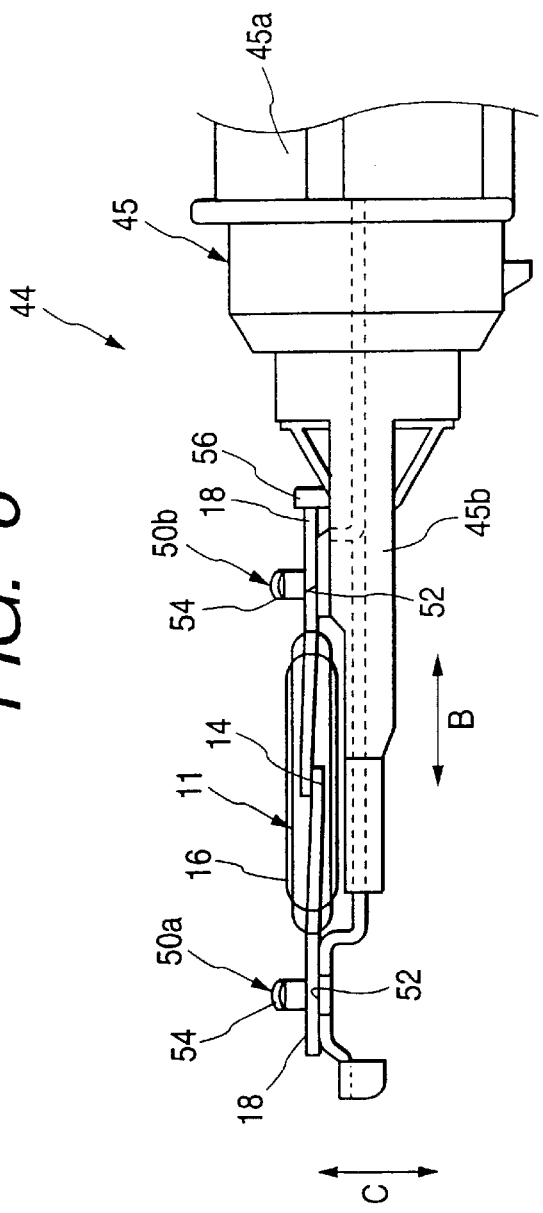
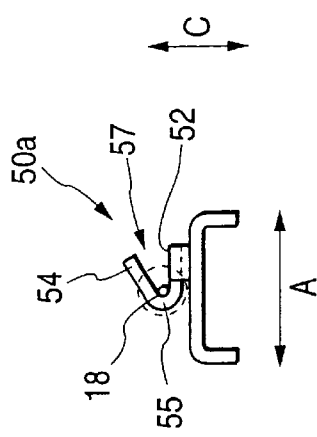

SWITCH UNIT

BACKGROUND OF THE INVENTION

The present invention relates to a switch unit, particularly a reed switch unit to be utilized for detecting a liquid level in a reservoir tank in a master cylinder.

A brake system employed in a driving automobile is so constructed that a brake liquid circulates in a hydraulic circuit which is formed between the master cylinder adapted to be connected to a brake pedal or the like and a wheel cylinder adapted to be connected to a wheel brake. To the master cylinder is fitted a reservoir tank in which the brake liquid is stored to be supplied to the master cylinder.

In order to assure an accurate operation of the brake system, it is necessary that more than a determined amount of the brake liquid is always stored in the reservoir tank. For this reason, there is provided in the reservoir tank a liquid level detecting sensor for detecting the liquid level of the brake liquid stored therein, in order to issue a warning to a driver, etc. when the brake liquid has decreased below a prescribed amount.

The liquid level detecting sensor consists of a float which moves up and down with a vertical movement of the liquid level of the brake liquid and has a permanent magnet, and a reed switch unit having a reed switch for detecting the vertical movement of the float. The reed switch is an electric component of such a structure that its contacts are adapted to be closed when the permanent magnet in the float approaches the reed switch.

A conventional reed switch unit is shown in FIGS. 1 and 2.

The reed switch unit 10 is composed of a reed switch 11 and a unit body 12 which is formed of a synthetic resin and on which the reed switch unit 11 is mounted.

The reed switch 11 is so constructed that a contact part 14 of which contacts are adapted to be closed in association with an approach of the permanent magnet is sealed inside a glass tube 16. In the glass tube 16 is sealed an inert gas (for example, nitrogen gas) in order to prevent oxidation, frosting, etc.

The glass tube 16 is provided at its opposite ends with lead portions 18 which are adapted to be connected to the contact part 14.

The unit body 12 formed of a synthetic resin comprises a coupler part 12a which can be connected to another electric circuit on the right hand in the drawing, and a switch receiving part 12b on which the reed switch 11 is adapted to be mounted on the left hand in the drawing.

The switch receiving part 12b is provided with metal terminal members 20 to be connected with the respective lead portions 18, 18 of the reed switch 11. Each of the terminal members 20 is formed of a plate-like member provided with a slit 22 which can grasp the lead portion 18 and projecting upward from the switch receiving part 12b. The terminal members 20 are respectively connected to coupler terminals 23 which are shown by a dotted line in the coupler part 12a.

The reed switch 11 is fitted to the unit body 12 and fixed by soldering after both the lead portions 18, 18 have been grasped in the slits 22 of the terminal members 20. Because the lead portions 18 and the terminal members 20 are fixed by soldering, both physical fixations and electrical connections of the lead portions 18 can be assured.

In order to help positioning of the glass tube 16 when the reed switch 11 is fixed to the terminal members 20, the unit body 12 has, at a position where the glass tube 16 is to be located, ribs 24 which are integrally formed with the unit body 12 and upwardly project from the switch receiving part 12b so as to surround side faces of the glass tube 16.

By providing the ribs 24, when the reed switch 11 is mounted, the glass tube 16 is first placed between the ribs 24, and then fixed by soldering after the lead portions 18 are grasped in the slits 22 of the terminal members 20. Therefore, the reed switch 11 is securely fixed at a determined position (For example, see a Japanese Patent Unexamined Publication No. Hei.7-220817).

As described above, it has been a conventional manner that the lead portions and the terminal members are fixed by soldering, when the reed switch is mounted on the unit body.

However, there is such a problem that in case the soldering should be conducted at two points at the same time when the lead portions and the terminal members are connected, it is difficult to solder at the two points at the same time because a stress occurs in a direction of pulling the glass tube. There is a further problem that the soldering takes a long heat introducing time into components to be connected, and a line tact in the process will be extended. Moreover, after the soldering has been carried out, the solder will be inevitably splashed, and in case that the solder has entered between the glass tube and the unit body, there will be a fear that the glass tube may be broken. This will lead to a decrease in productivity because scattering of the solder must be detected and so on.

Further, there is still another problem that since the soldering takes a long heat introduing time, the heat will be easily conducted to the glass tube or the connected parts which are in contact with the lead portions, and the inert gas in the glass tube will escape.

Further, a quality control is difficult with the soldering, because it results in a faulty joint in case where the heat introducing time is too short or the faces to be connected are not clean.

In addition to this, a conventional reed switch unit for the reservoir tank has been also known as disclosed, for example, in Japanese Patent Unexamined Publication No. Hei.4-325362.

The conventional reed switch unit for a reservoir tank to be mounted on the reservoir tank is used for storage of operating liquid or the like in a master cylinder. The reed switch unit is contained in a switch housing formed in the reservoir tank in isolation from an interior thereof and comprises a reed switch, a first and a second terminal members and a coupler part.

The first and a second terminal members respectively have a first and a second connecting terminals respectively connected to a first and a second reed parts of the reed switch, and a first and a second coupler terminals at their respective opposite ends. The coupler part is formed of a synthetic resin and connected by molding to an intermediate portion between the first and the second terminal members to receive the first and the second coupler terminals.

In the conventional reed switch unit for the reservoir tank, because the first and the second terminal members to which the coupler part of the synthetic resin is connected by molding are individually manufactured, it has been difficult to accurately set the first and the second terminal members at respective fixed positions in metal molds on occasion of molding the coupler part. This has been a drawback when cut-down of the manufacturing cost is intended.

SUMMARY OF THE INVENTION

Accordingly, this invention has been made in order to solve the above described problems.

It is an object of a first aspect of the present invention to provide a reed switch unit in which the productivity is enhanced and the quality is improved by mounting the reed switch on the unit body without employing the soldering process.

The object can be attained by a reed switch unit for detecting a liquid level in a reservoir of a master cylinder, according to the present invention, which comprises a reed switch including a contact part which is sealingly contained in a glass tube, and lead portions which axially extend from opposite ends of the glass tube, and a unit body provided with terminal members for respectively supporting the lead portions so as to be electrically connectable thereby to fix the reed switch is characterized in that the lead portions and the terminal members are connected with each other by means of a resistance welding.

By employing this construction, the line tact will be shortened, because the heat introducing time into the components to be connected is shorter as compared with the fixing method by means of soldering. Moreover, the thermal conduction to the glass tube can be restrained, thus avoiding an escape of the inert gas sealed in the glass tube. Because the cleanness on the joint faces need not be taken into consideration, the reed switch unit of high quality can be manufactured without restricting the working environment.

Moreover, it is preferable that the resistance welding is conducted by fusing.

By employing this construction, even in case where different materials, that are, high conductive material such as brass, copper, etc. of the terminal members and ferromagnetic material of the lead portions are connected with each other, these materials can be maintained in the mated state by means of resiliences of the respective materials, because the terminal member is connected to the lead portion in such a manner that the terminal member embraces the lead portion.

In view of the above drawback, it is an object of a second aspect of the invention to provide the above mentioned reed switch unit for the reservoir tank in which the first and the second terminal members are constituted by a sheet of busbar thereby enabling the productivity to be enhanced and in addition enabling the reed switch unit to be made compact, while assuring a sufficient insulating gap between the first and the second terminal members.

In order to achieve the above described problem, the second aspect of the invention resides in a reed switch unit for a reservoir tank which is contained in a switch housing formed in the reservoir tank in isolation from an interior thereof, the reed switch unit comprising a reed switch, a first and a second terminal members respectively having a first and a second connecting terminals adapted to be respectively connected to a first and a second reed parts of the reed switch and a first and a second coupler terminals at their respective opposite ends, and further having a first and a second mold connecting parts at their respective intermediate positions, and a coupler part which is formed of a synthetic resin and adapted to be connected to the first and the second mold connecting parts so as to receive the first and the second coupler terminals, characterized in that the first and the second terminal members are constituted by a sheet of plate-like busbar having a connecting part which is cut and removed after the coupler part has been molded to block a connection between the first and the second terminal members, at least the first and the second mold connecting parts being positioned on a same horizontal plane, the first terminal member being provided with the first connecting terminal which is bent upward in a crank shape from the first mold connecting part and includes a connecting face which is higher in level than the mold connecting part, the second terminal member being provided with an extended part which horizontally extends from the second mold connecting part passing underneath the reed switch, and the second connecting terminal which is bent upward in a crank shape from the extended part in the same direction as the first connecting terminal and includes a connecting face positioned at substantially the same level as the connecting face of the first connecting terminal, the first and the second reed parts of the reed switch being connected to the connecting faces of the first and the second connecting terminals.

According to the second aspect of the invention, the first and the second terminal members can be easily connected to the coupler part keeping an accurate positional relation with respect to each other by employing a single plate-like busbar, and an improvement in its quality and productivity can be attained.

Further, because the first and the second connecting terminals to which the first and the second reed parts of the reed switch are connected are held at higher levels than the first mold connecting part and the extended part, the insulating gap between the first reed part and the extended part can be sufficiently secured even though the first mold connecting part and the extended part are located relatively close to each other in a horizontal direction. Moreover, the reed switch can be arranged above the extended part whereby the reed switch unit can be made compact. When the first and the second reed parts are connected to the first and the second connecting terminals by fusing or soldering, a thermal stress occurring in the first and the second connecting terminals by heat generated on this occasion will be absorbed by a crank-shaped bent portion and a breakage of the reed switch can be avoided.

Even in case where a distance between the first and the second connecting terminals is apt to change with an expansion, shrinkage and deformation arising in components of the reed switch unit due to a change in the atmospheric temperature around the reservoir tank, the above described expansion, shrinkage and deformation can be absorbed thereby to avoid the breakage of the reed switch.

In addition to the second aspect of the present invention, the third aspect of the present invention resides in a reed switch unit for a reservoir tank, wherein the above described coupler part is integrally formed with a switch receiving part which is formed of a synthetic resin and adapted to be connected to the extended part by molding thereby to support the reed switch.

According to the third aspect of the present invention, the reed switch receiving part can provide a stable support for the reed switch and an effective insulation of the reed switch with respect the extended part, and further, the switch receiving part can be easily molded together with the coupler part.

BRIEF DESCRIPTION OF THE DRAWINGS

FIG. 5 is a plan view showing a structure of a reed switch unit according to the invention;

FIG. 6 is a side view of the reed switch unit as shown in FIG. 5;

FIG. 7 is a front view of the reed switch unit as shown in FIG. 5;

DETAILED DESCRIPTION OF THE PREFERRED EMBODIMENTS

Figure 1:
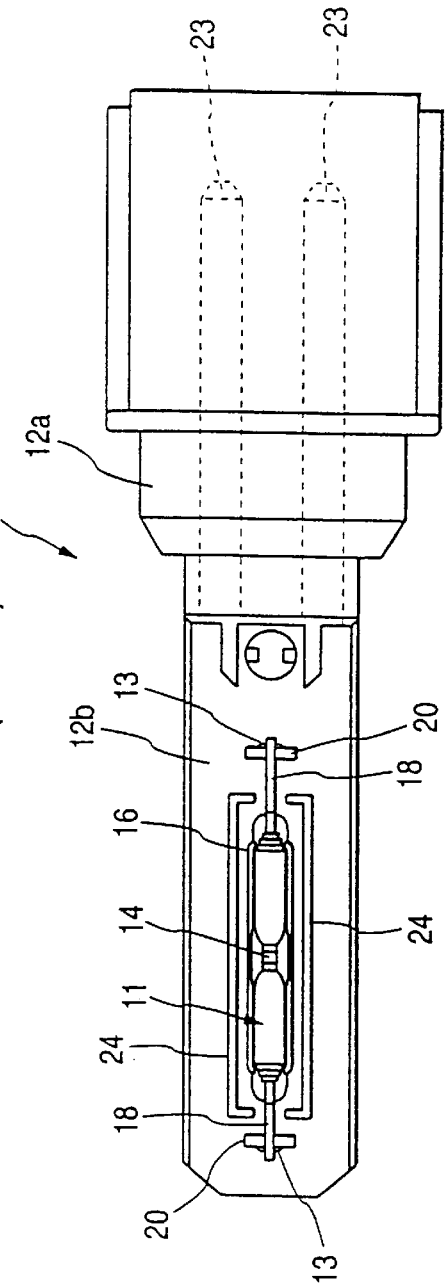
FIG. 1 is a plan view showing a structure of a conventional reed switch unit.
Figure 2:
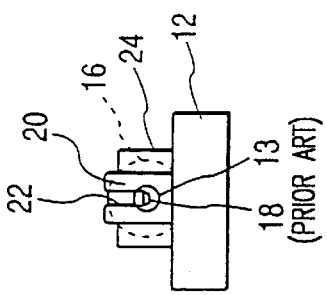
FIG. 2 is a front view of the reed switch unit as shown in FIG. 1.
Figure 3:
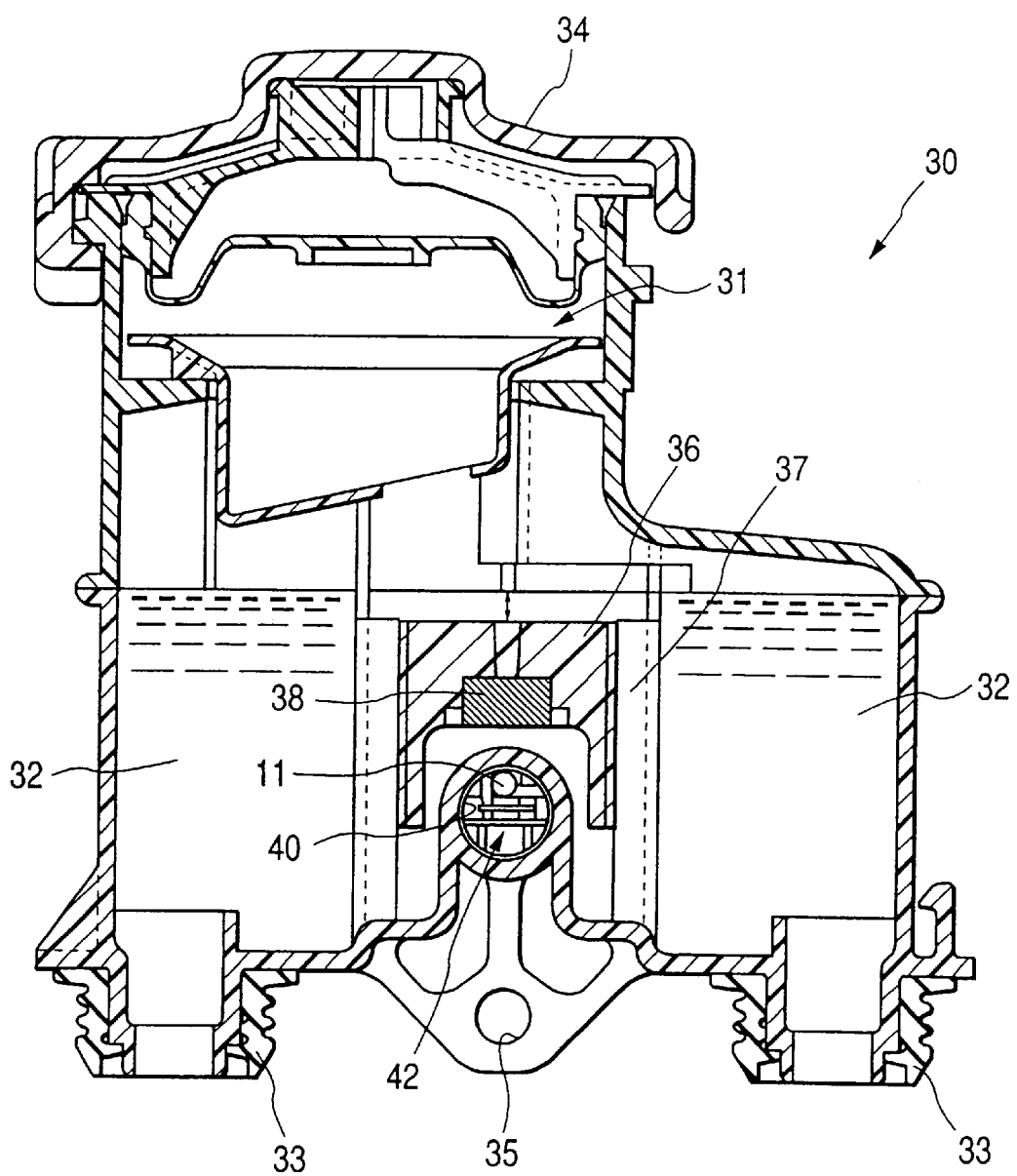
FIG. 3 is a sectional view of a reservoir tank when viewed from a front face.
Figure 4:
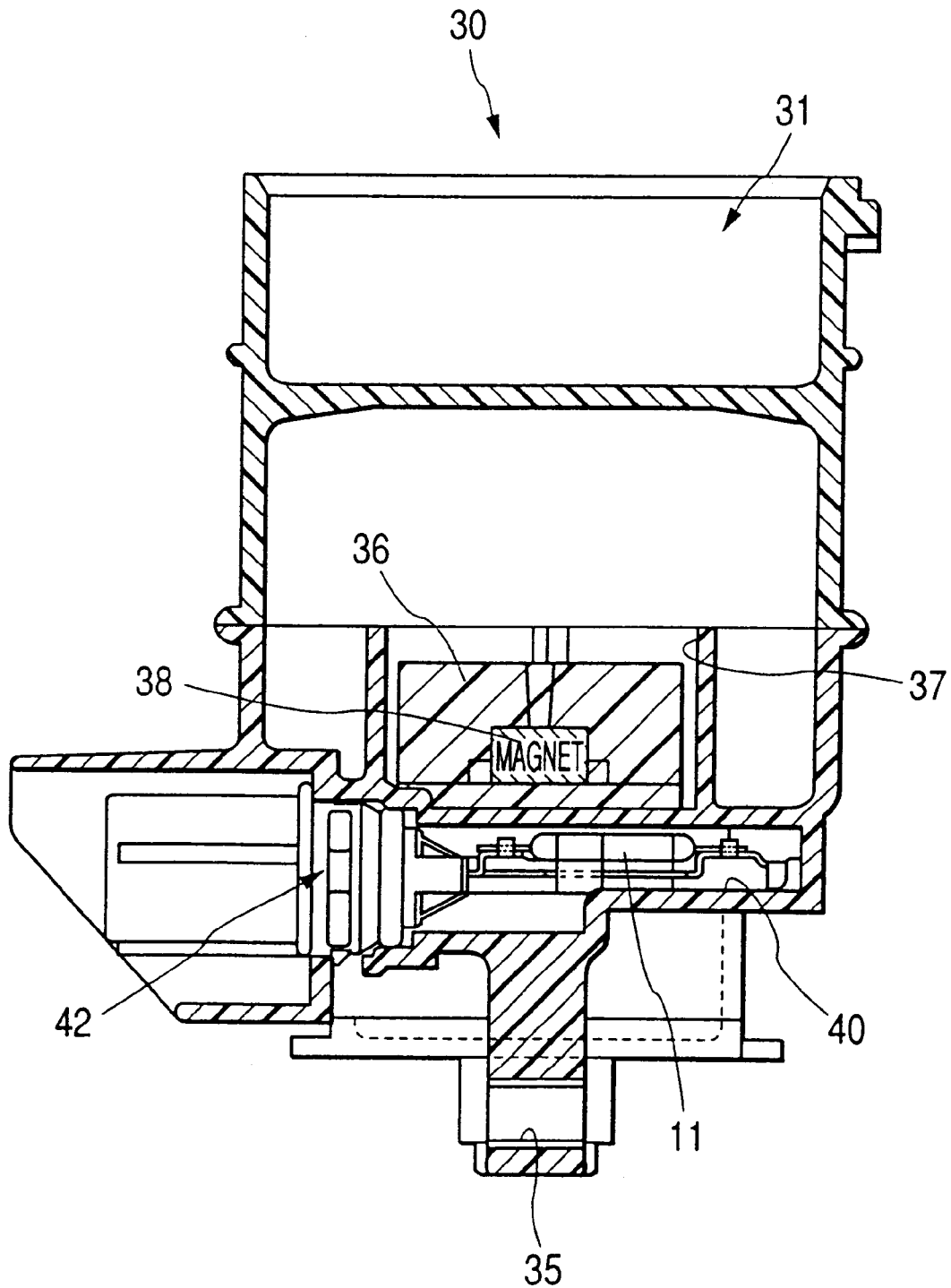
FIG. 4 is a sectional view of the reservoir tank as shown in FIG. 3 when viewed from a side face.

Referring to FIG. 3 showing an example of a reservoir tank which is mounted on a master cylinder of a brake system, relation between the reservoir tank and the reed switch will be explained.

In the mode for carrying out the invention described below, constituting elements which are the same as those described in the prior art will be denoted with the same reference numerals and their explanation will be omitted.

In the reservoir tank 30, there is stored brake liquid 32 as explained referring to the prior art, and the stored brake liquid 32 is supplied to the master cylinder (not shown). The reservoir tank 30 is mounted on the master cylinder by way of rubber packings 33 which are shown in a lower part of the drawing. A fixing screw (not shown) is inserted into a fixation hole 35 to fix the reservoir tank with respect to the master cylinder.

A lid member 34 closes a liquid inlet 31 of the reservoir tank 30 so as to prevent the brake liquid 32 from flowing out or evaporating.

A float containing part 37 is provided near a centeral part of the reservoir tank 30 a float 36 is formed of a foamed resin having a buoyancy with respect to the brake liquid. This float 36 moves up and down (in a direction of an arrow in FIG. 3) in the float containing part 37 in association with a vertical movement of the liquid level of the brake liquid 32. A permanent magnet 38 is incorporated in the float 36.

Below the float containing part 37 is formed a switch unit containing bore 40 which can contain a reed switch unit 42 in communication with an exterior of the reservoir tank 30 and which is isolated from the brake liquid 32. The reed switch unit 42 contained in the switch unit containing bore 40 and the float 36 act as a liquid level detecting sensor for detecting the liquid level of the brake liquid 32.

The above described liquid level detecting sensor will be operated in association with the vertical movement of the float 36, as the reed switch 11 detects a magnetic flux of the permanent magnet 38 which is incorporated in the float 36.

In other words, when the liquid level of the brake liquid 32 in the reservoir tank 30 has descended, the permanent magnet 38 comes close to the reed switch 11 and the contact part of the reed switch 11 will be closed, and thus the descent of the liquid level of the brake liquid 32 will be detected.

Now, one embodiment of the reed switch unit will be described referring to FIGS. 5 to 7.

The reed switch unit 44 according to this embodiment consists of a reed switch 11 having the same shape as described in the prior art, and a unit body 45 formed of a synthetic resin.

The unit body 45 includes a coupler part 45a to be connected to another electric circuit on the right hand in the drawing, and a switch receiving part 45b on which the reed switch 11 is adapted to be mounted on the left hand in the drawing.

At determined positions in the switch receiving part 45b, are provided terminal members 50a, 50b for connecting and fixing respective lead portions 18 in order to mount the reed switch 11 on the unit body 45. The terminal members 50a, 50b are members made of metal which are integrally formed with respective coupler terminals 23, 23 in the coupler part 45a.

Each of the terminal members 50a consists of a carrying part 52 on which the lead portion 18 is carried, and a bent piece 54 which is bent so as to face with the carrying part 52 enabling the lead portion 18 to be grasped between them. The bent piece 54 and the carrying part 52 are formed in a U- or V-shape when viewed from the front face (FIG. 7).

The terminal 50a positioned on the left hand in the drawing is formed projecting to the left from the switch receiving part 45b of the unit body 45 which is formed of a synthetic resin.

On the contrary, the terminal 50b positioned on the right hand in the drawing is formed projecting into an open space 47 which is open into the switch receiving part 45b from an inner wall 47a which is closer to the coupler part 45a than the open space 47, so that it is positioned in the open space 47.

When the reed switch 11 is mounted on the unit body 45, the lead portion 18 is inserted into a joint part 55 (a bottom of the U- or V-shape) between the bent piece 54 and the carrying part 52 of the terminal member 50a from a connecting plane 57 between the bent part 54 and the carrying part 52, and abutted against the joint part 55. In this way, a mounting position in a direction of width (in a direction of an arrow A in FIGS. 5 and 7) of the reed switch 11 when it is mounted on the unit body 45 can be determined.

The position of the reed switch 11 in a vertical direction (in a direction of an arrow C in FIGS. 6 and 7) can be determined by placing the lead portion 18 on the carrying part 52 of the terminal member 50a.

On this occasion, a stopper wall 56 may be provided between the terminal 50b and the coupler part 45a so that the lead portion 18 of the reed switch 11 can be abutted.

By thus abutting the lead portion 18 against the stopper wall 56, the position of the reed switch 11 in its axial direction (in a direction of an arrow B in FIGS. 5 and 6) on occasion of fitting the reed switch 11 to the terminal member 50a can be determined.

As described above, after the reed switch 11 has been positioned on the unit body 45, and the lead portion 18 has been placed between the bent piece 54 and the carrying part 52 of the terminal member 50a, a resistance welding will be conducted while folding the bent piece 54 of the terminal member 50a so as to completely close the connecting plane 57, to thereby forming a resistance welded portion for connecting the lead portion and the terminal member with each other.

Figure 8:
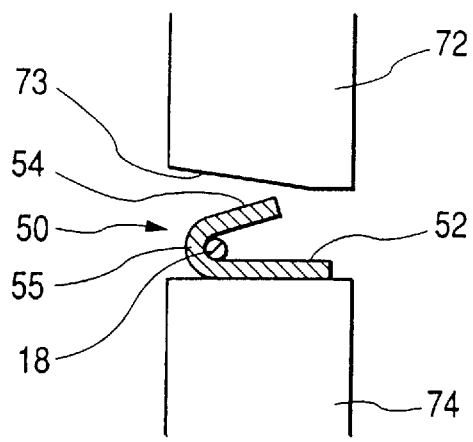
FIG. 8 is an explanatory view illustrating a step where fusing is applied to a terminal member.
Figure 9:
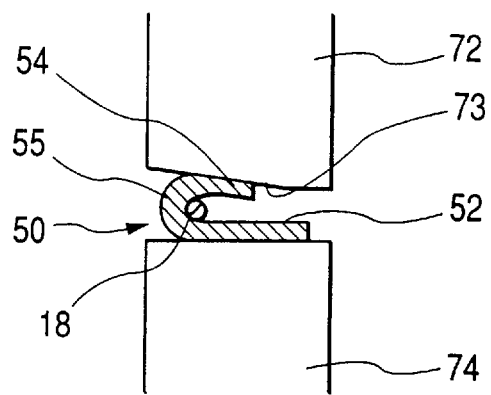
FIG. 9 is an explanatory view illustrating a step where the fusing is applied to the terminal member.
Figure 10:
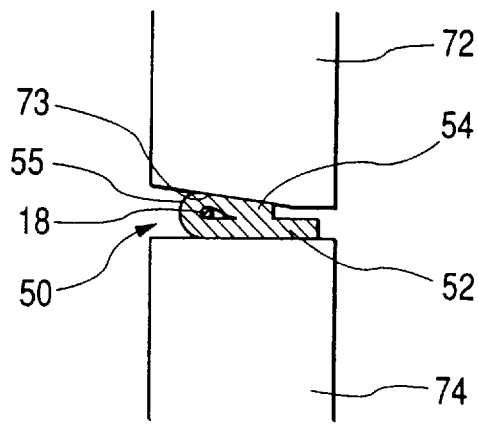
FIG. 10 is an explanatory view illustrating a step where the fusing is applied to the terminal member.

FIGS. 8 to 10 are explanatory views showing the resistance welding which is conducted on the terminal member 50 and the lead portion.

The resistance welding means a welding method in which a large current is applied to both components to be welded in an extremely short period to generate heat by means of a resistance inherent in a material and a contact resistance between the components to be welded, thereby conducting the welding. As one example of the resistance welding, fusing method will be explained hereunder.

Electrodes 72, 74 are first arranged above and below each of the terminal members 50. A mating face 73 of the upper electrode 72 of these electrodes is formed in a diagonal face gradually inclined upwardly toward the joint part 55 between the bent piece 54 and the carrying part 52 of the terminal member 50.

It is to be noted that because the terminal 50a projects from the switch receiving part 45b to the left in the drawings to be exposed at its metal part, it is possible to arrange the electrodes 72, 74 in a vertical direction. With reference to the terminal 50b too, it is also possible to arrange the electrodes 72, 74 in a vertical direction because the terminal 50b is provided in the open space 47.

In this way, the two upper and lower electrodes 72, 74 are brought into contact respectively with the bent piece 54 and the carrying part 52 of the terminal member 50. Then, the upper electrode 72 is lowered, and the bent part 54 is forced to be folded along the inclined angle of the mating face 73 provided in the upper electrode 72 and abutted against the carrying part 52.

Then, when a force (pressing force) for lowering the upper electrode 72 has reached a preset value, a determined value of an electric current is applied between the electrodes 72 and 74 so that the current flows between the bent part 54 and the carrying part 52 to generate heat in both the components, allowing both the joint faces to be melted and welded. Specifically, the electric current of 1.5 kA may be applied in about 50 msec. and the pressure of about 8 kgf may be applied.

In case of such fusing, the bent part 54 and the carrying part 52 are melted and welded to each other, but the lead portion 18 is different in material from the terminal member 50, that is, the terminal member 50 is formed of a high conductive material such as mainly brass, copper, etc. while the lead portion 18 is made of mainly a ferromagnetic material and cannot be melted nor welded to the terminal member 50, because the melting point of the ferromagnetic material is higher than that of brass and copper. In short, the read portion 18 is pressed and connected by means of a resilient force of the bent part 54 and the carrying part 52 in such a state that it is grasped between the bent part 54 and the carrying part 52.

It is recommended to keep the electrodes 72, 74 in contact with the terminal member 50 for some time after the welding has been completed. By doing this, the heat generated in the terminal member 50 will be absorbed by the electrodes 72, 74 and the terminal member 50 will be rapidly cooled. By rapidly cooling the heat in the terminal member 50 in this way, the thermal conduction to the glass tube 16 can be prevented thereby avoiding a leakage of the inert gas which is sealed in the glass tube 16.

Moreover, it is preferable to provide the electrodes 72, 74 with cooling devices (not shown) to shorten the cooling period for the terminal member 50.

The lead portion 18 of the reed switch 11 may be previously coated with a plating having a low melting point (for example, tin).

By applying the plating to the lead portion 18, the plating will be melted with the heat generated in the terminal member 50, and the lead portion 18 will be more rigidly fixed to the terminal member 50.

The resistance welding is not limited to the above described fusing method, but may include spot welding, projection welding, etc. The spot welding and the projection welding also shorten the heat introducing period into the components to be connected. Accordingly, the line tact will be shortened thereby to improve the production efficiency, and the thermal conduction to the glass tube will be restrained thereby to avoid an escape of the inert gas in the glass tube. As a result, a high quality of the reed switch unit can be obtained.

Hereinafter, a preferable embodiment according to the second aspect of the present invention will be described in the accompanying drawings.

Figure 11:
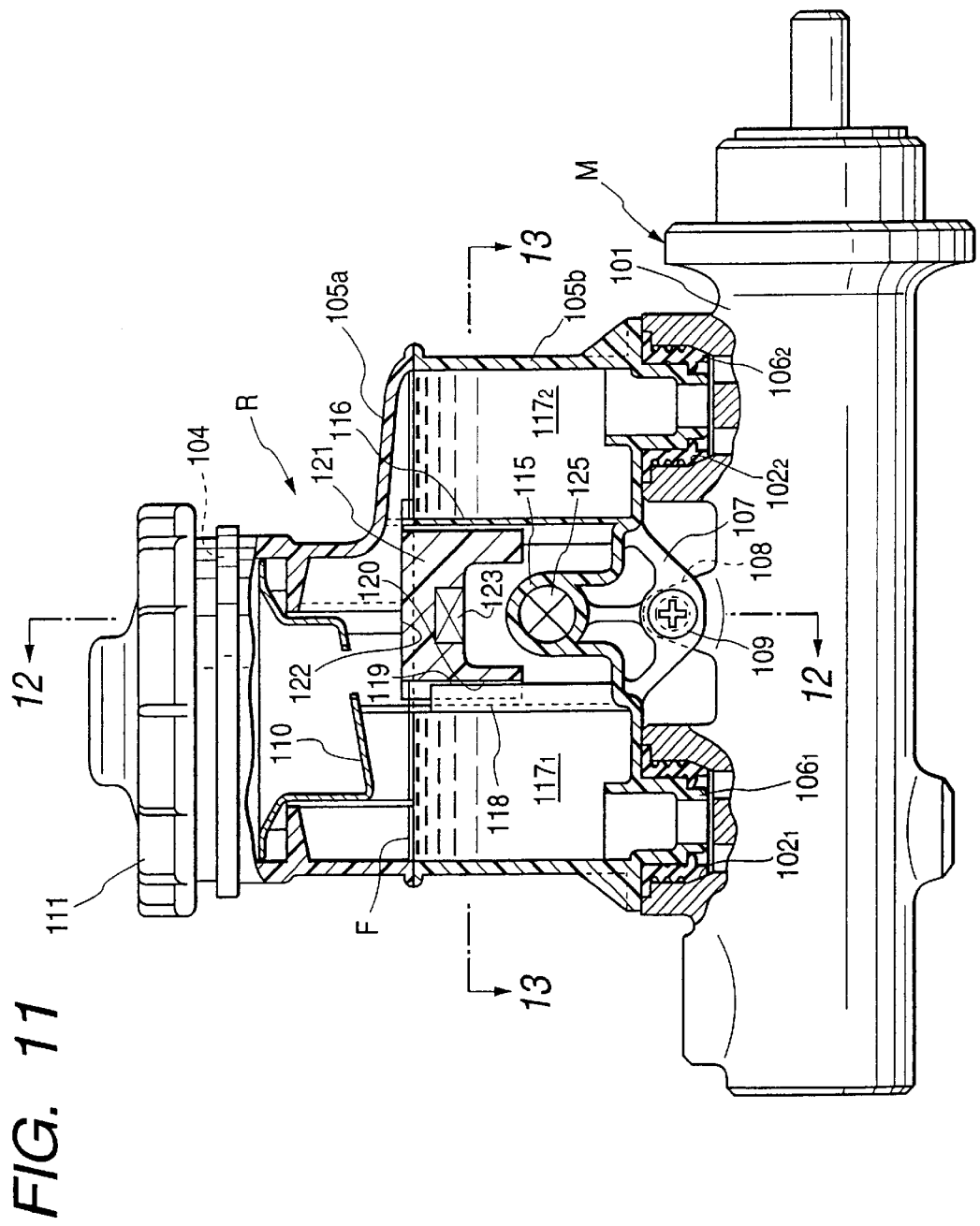
FIG. 11 is a side view in a vertical section of an essential part of a master cylinder with a reservoir tank provided with a reed switch unit according to the invention.
Figure 12:
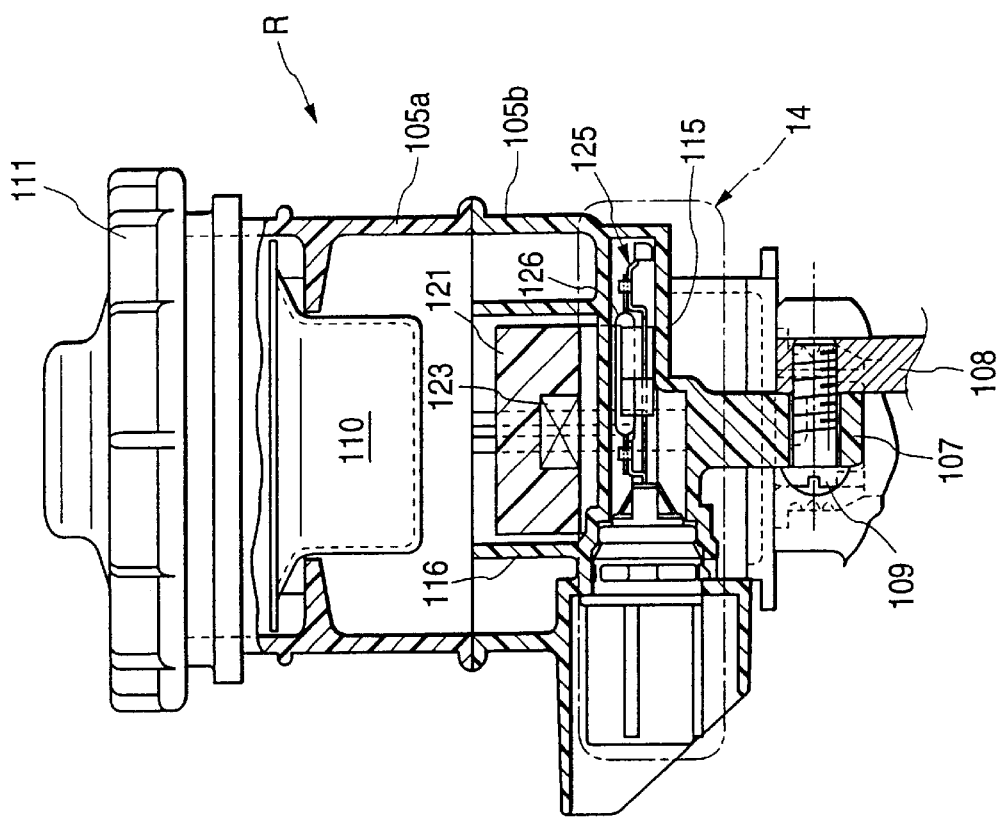
FIG. 12 is a sectional view taken along a line 12—12 in FIG. 11.
Figure 13:
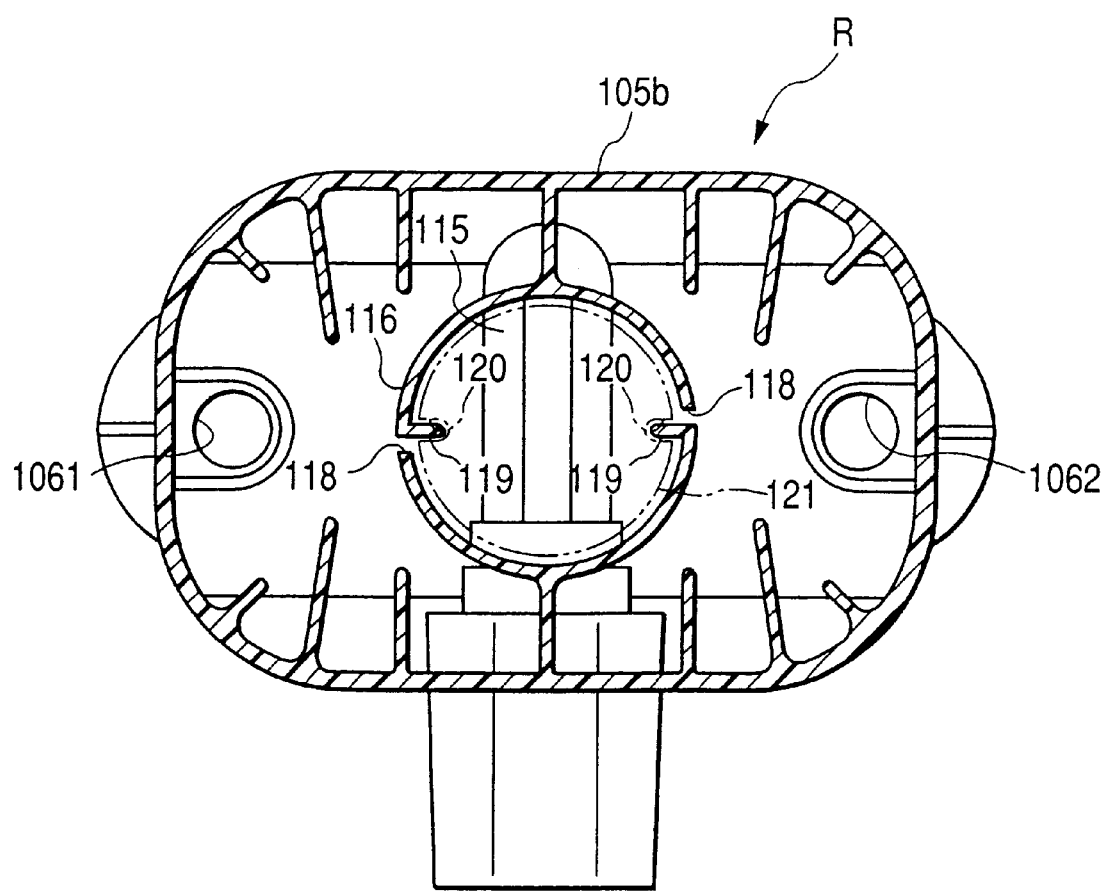
FIG. 13 is a sectional view taken along a line 13—13 in FIG. 11.
Figure 14:
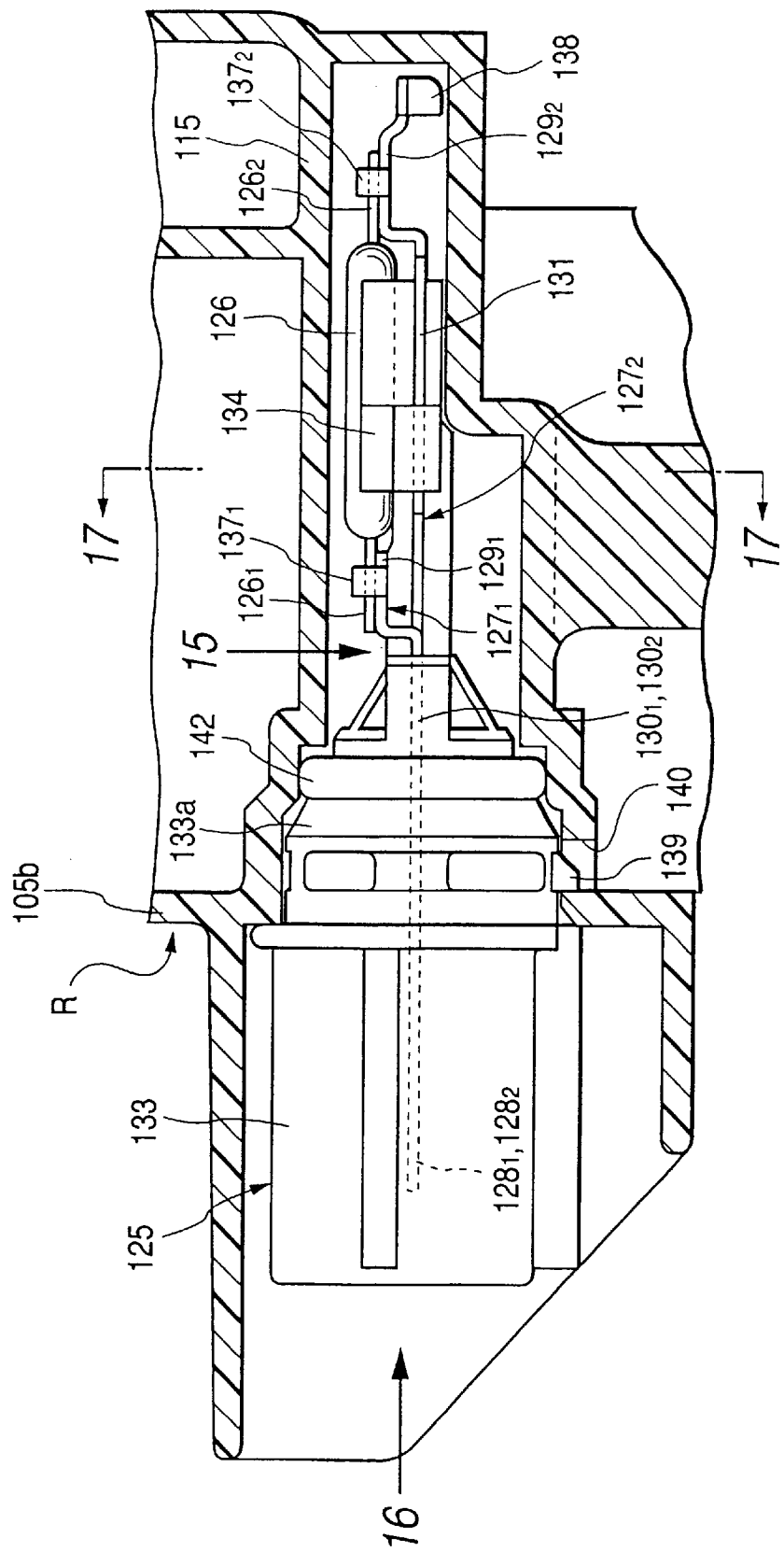
FIG. 14 is an enlarged view of a part 14 in FIG. 12.
Figure 15:
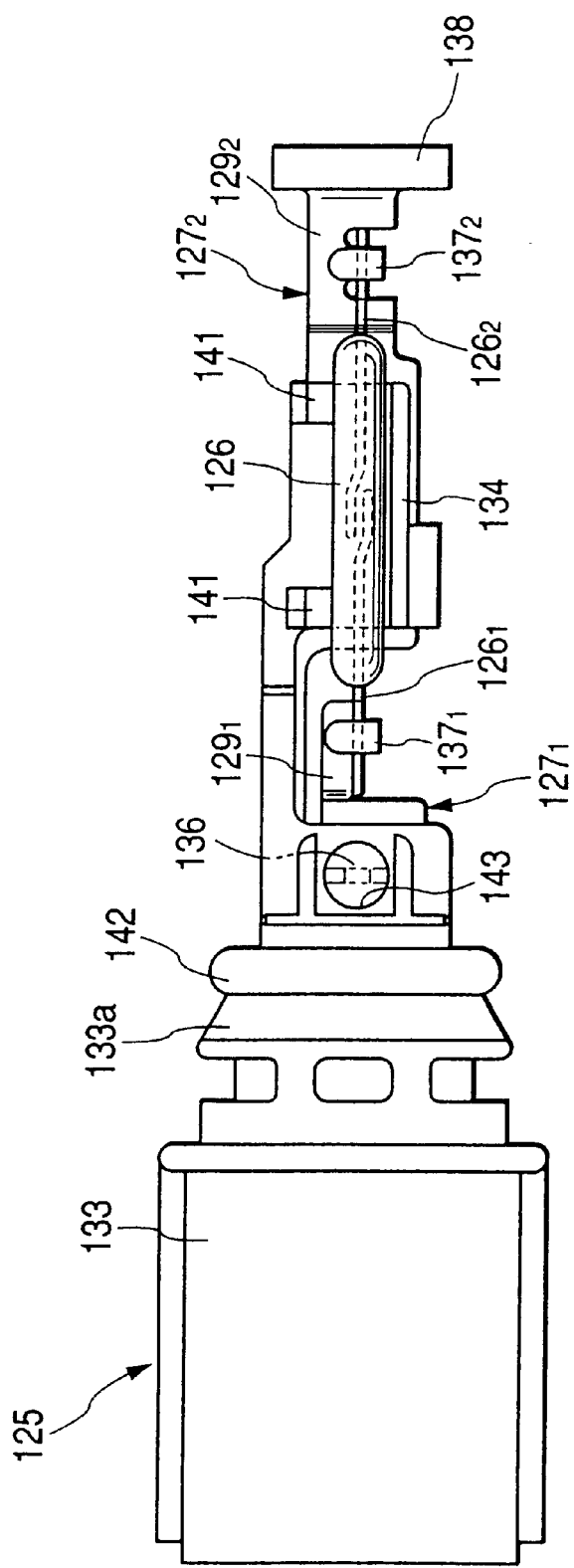
FIG. 15 is a view seen in a direction of an arrow 15 in FIG. 14.
Figure 16:
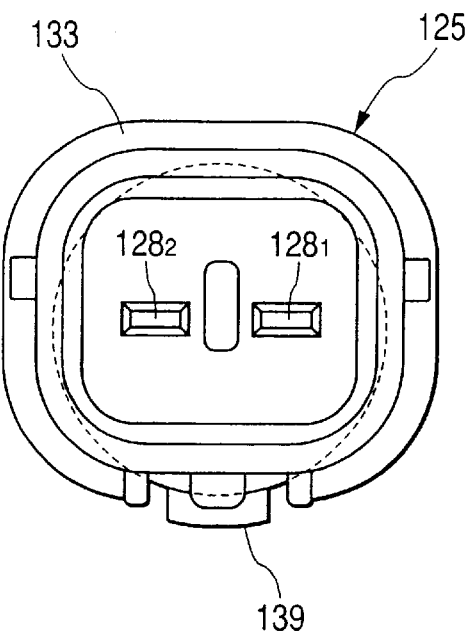
FIG. 16 is a view seen in a direction of an arrow 16 in FIG. 14.
Figure 17:
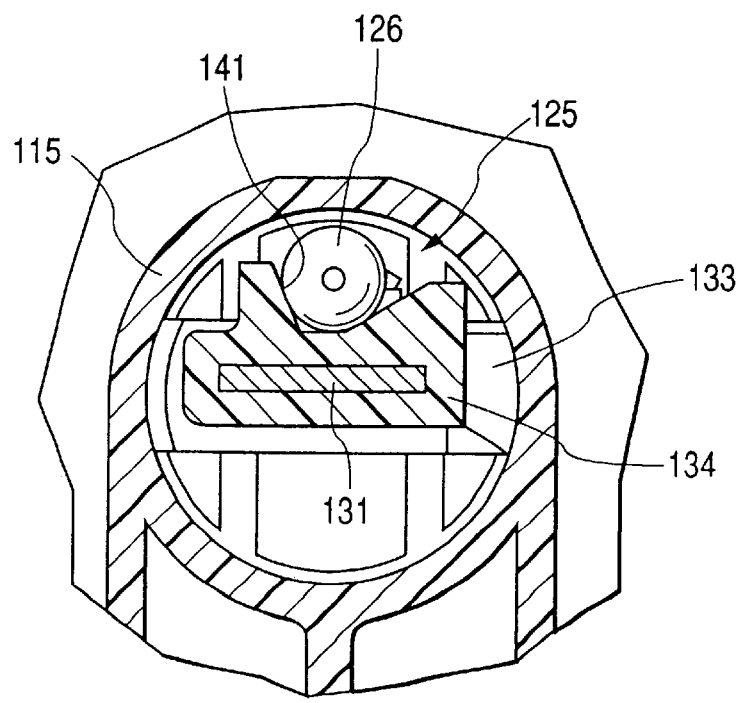
FIG. 17 is a sectional view taken along a line 17—17 in FIG. 14.
Figure 18:
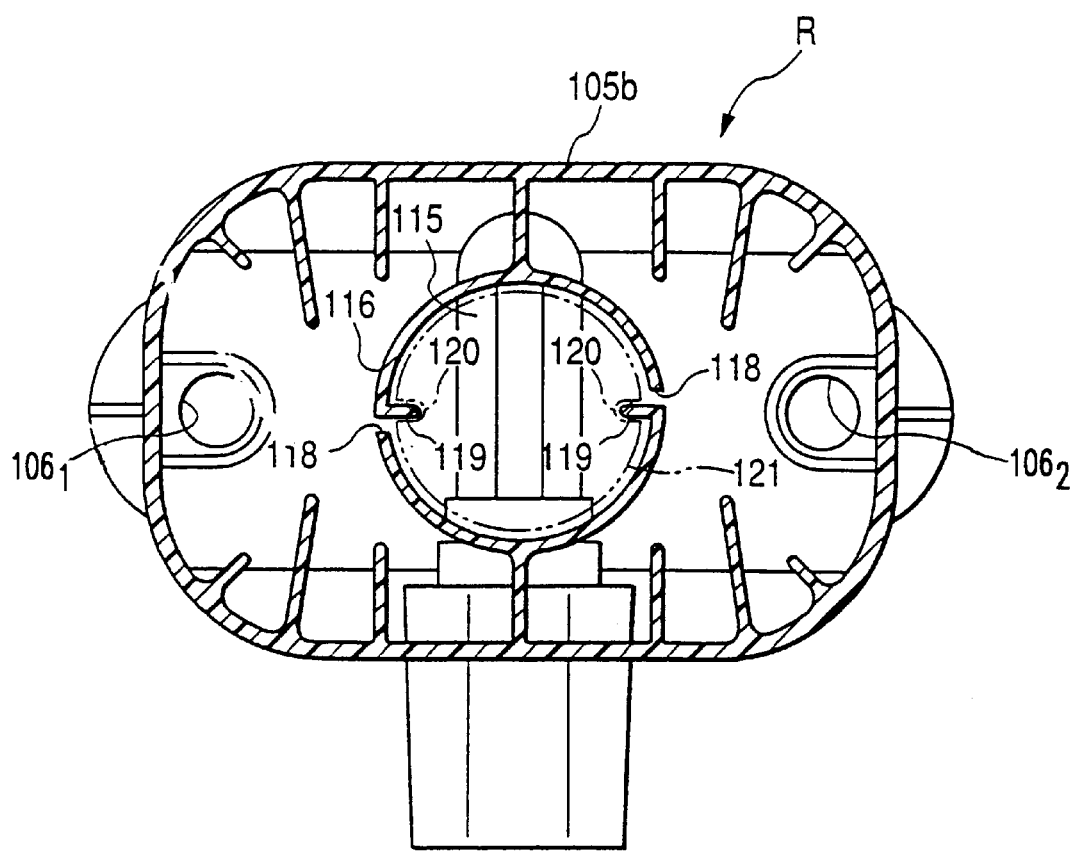
FIG. 18 is a perspective view of a busbar.

FIG. 11 is a side view in a vertical section of an essential part of the master cylinder with the reservoir tank provided with the reed switch unit according to the invention, FIG. 12 is a sectional view taken along a line 12—12 in FIG. 11, FIG. 13 is a sectional view taken along a line 13—13 in FIG. 11, FIG. 14 is an enlarged view of a part 14 in FIG. 12, FIG. 15 is a view seen in a direction of an arrow 15 in FIG. 14, FIG. 16 is a view seen in a direction of an arrow 16 in FIG. 14, FIG. 17 is a sectional view taken along a line 17—17 in FIG. 14, and FIG. 18 is a perspective view of a busbar.

In FIGS. 11 to 13, M is a master cylinder of a tandem type adapted to operate a brake of two circuit system in an automobile. A reservoir tank R provided with the reed switch unit according to the invention is fixed to an upper face of a cylinder body 101 of the master cylinder M which is provided with a pair of front and back operating liquid inlets 121 and 122. The operating liquid F for the master cylinder M is stored in the reservoir tank R.

The reservoir tank R consists of an upper reservoir half 105a formed of a synthetic resin and having a liquid supply inlet 104 at its upper end, and a lower reservoir half 105b formed of a synthetic resin and having a pair of front and back outlet pipes $106_1$, $106_2$ at its lower end. The upper and the lower reservoir halves 105a, 105b are welded to each other to compose the reservoir tank R. The outlet pipes $106_1$, $106_2$ are liquid-sealingly fitted to the brake liquid inlets 121, 122 of the cylinder body 101. Connecting pieces 107, 108 projectingly formed on respective mating faces of the lower reservoir half 105b and the cylinder body 101 are fixed to each other by means of a bolt 109.

To the upper reservoir half 105a, is attached a filter so as to face with the liquid inlet 104. The liquid inlet 104 is closed with a lid member 111.

A cylindrical switch housing 115 laterally traversing the intermediate portion between the front and the back outlet pipes $106_1$, $106_2$ and a cylindrical float containing part 116 which is upright higher than the switch housing 115 and centered at the middle portion of the switch housing 115 in a longitudinal direction are integrally formed on a bottom wall of the lower reservoir 105b. The switch housing 115 serves also as a partition for dividing the lower part inside the reservoir tank R into a front and back final liquid storage chambers $117_1$, $117_2$ which respectively communicate with the above described outlet pipes $106_1$, $106_2$. In the float containing part 116 are formed a pair of a front and a back slits 118, 118 for allowing communication between the interior of the float containing part 116 and the final liquid storage chambers $117_1$, $117_2$. At an inner wall of the float containing part 116 are formed a pair of front and back positioning ridges 119, 119 which extend vertically, and a float 121 having positioning grooves 120, 120 adapted to engage with the positioning ridges 119, 119 is contained in the float containing part 116 so as to freely move up and down. The float 121 can float on the brake liquid F stored in the reservoir tank R, and its upper floating limit is adapted to be regulated by means of a stopper wall 122 projectingly formed on an inner wall of the upper reservoir half 105a. A permanent magnet 123 is embedded in a lower end face of the float 121. There is contained in the switch housing 115 a reed switch unit 125 according to the invention which is adapted to detect a descended position of the float 121, that is a position of the permanent magnet 123 when a remaining amount of the brake liquid F has become less than the prescribed value.

Because the front and back final liquid storage chambers $117_1$, $117_2$ are separated by the switch housing 115, in case where a line of the two circuit hydraulic brake system becomes defective and the brake liquid in one of the final liquid storage chambers $117_1$, $117_2$ becomes dried up, the other line of the hydraulic brake system can be normally operated by continuously storing the brake liquid F in the other final liquid storage chamber $117_1$ or $117_2$.

Now, referring to FIGS. 14 to 18, the reed switch unit 125 according to the invention will be described.

The reed switch unit 125 consists of a reed switch 126, a first and a second terminal members $127_1$, $127_2$ and a coupler part 133 formed of a synthetic resin.

The first terminal member $127_1$ has at its opposite ends a first connecting terminal $129_1$ which is adapted to be connected to a first reed part $126_1$ of the reed switch 126 and a first coupler terminal $128_1$ which is adapted to be disposed in the coupler part 133. Between the first connecting terminal $129_1$ and the first coupler terminal $128_1$ is provided a first mold connecting part $130_1$ which is adapted to be connected to the coupler part 133 by molding. The second terminal member $127_2$ has at its opposite ends a second connecting terminal $129_2$ which is adapted to be connected to a second reed part $126_2$ of the reed switch 126 and a second coupler terminal $128_2$ which is adapted to be disposed in the coupler part 133. Between the second connecting terminal $129_2$ and the second coupler terminal $128_2$ is provided a second mold connecting part $130_2$ which is adapted to be connected to the coupler part 133 by molding, and an extended part 131 which extends from the second mold connecting part $130_2$ up to the second connecting terminal $129_2$. To the extended part 131 is connected by molding a switch receiving part 134 formed of a synthetic resin which is integrally formed with the coupler part 133 and adapted to support the reed switch 126 at a determined position.

As shown in FIG. 18, the first and the second terminal members $127_1$, $127_2$ are constituted by a sheet of plate-like busbar 135 formed of brass. The first and the second coupler terminals $128_1$, $128_2$, the first and the second mold connecting parts $130_1$, $130_2$, and the extended part 131 are arranged on a same horizontal plane. The first and the second mold connecting parts $130_1$, $130_2$ are integrally connected by means of connecting portion 136 which is adapted to be cut and removed after the coupler part 133 has been molded, and blocks a connection between the first terminal member $127_1$ and the second terminal member $127_2$.

The first connecting terminal $129_1$ is bent upwardly in a crank shape from a tip end of the first mold connecting part $130_1$ to form a horizontal connecting plane $129_{1a}$ which is leveled higher than the first mold connecting part $130_1$, and a bent piece $137_1$ is integrally provided at one side edge of the horizontal connecting plane $129_{1a}$. The second connecting terminal $129_2$ is bent upwardly in a crank shape from a tip end of the extended part 131 to form a connecting plane $129_{2a}$ which is positioned at substantially the same level as the connecting plane $129_{1a}$, and a bent piece $137_2$ is also integrally provided at one side edge of the connecting plane $129_{2a}$. At a tip end of the second connecting terminal $129_2$ is integrally formed a T-shaped positioning piece 138.

On occasion of molding the coupler part 133, the busbar 135 is set at a determined position in a metal mold and a molten resin is injected into the metal mold. Then, at the same time with molding of the coupler part 133 and the switch receiving part 134, the connection between the coupler part 133 and the first and the second mold connecting parts $130_1$, $130_2$, and the connection between the switch receiving part 134 and the extended part 131 are respectively performed.

On this occasion, since the first and the second terminal members $127_1$, $127_2$ are integrally connected with each other at their first and the second mold connecting parts $130_1$, $130_2$ by means of the connecting part 136, it is only necessary to pay attention to positioning of the single busbar 135 in the metal mold, thereby enabling both the terminal members $127_1$, $127_2$ to be easily coupled to the coupler part 133 keeping their accurate positional relation with each other. Thus, the quality and the productivity of the reed switch unit can be improved.

After the coupler part 133 has been molded, the above mentioned connecting part 136 is cut and removed, and by this, the connection between both the terminal members $127_1$ and $127_2$ will be blocked. The cutting is effected through a working hole 143 (See FIG. 15) formed in the coupler part 133.

An annular shielding member 142 is attached around a base part 133a of the coupler part 133 connected to the first and the second mold connecting parts $130_1$, $130_2$. The base part 133a is integrally formed with a locking claw 139 which extends from the outer periphery thereof.

On an upper face of the switch receiving part 134 are formed a pair of front and back V-shaped notches 141, 141. The reed switch 126 is engaged with the notches 141, 141, and the first and the second reed parts $126_1$, $126_2$ of the reed switch 26 are placed on the connecting planes $129_{1a}$, $129_{2a}$ of the first and the second connecting terminals $129_1$, $129_2$. Then, the bent pieces $137_1$, $137_2$ are bent toward the corresponding connecting planes $129_{1a}$, $129_{2a}$ to grasp the first and the second reed parts $126_1$, $126_2$ while conducting fusing or soldering.

As described above, the first and the second connecting terminals $129_1$, $129_2$ to which the first and the second reed parts $126_1$, $126_2$ of the reed switch 126 are connected are positioned at the higher levels than the first mold connecting part $130_1$ and the extended part 131. Therefore, even though the first mold connecting part $130_1$ and the extended part 131 are arranged relatively close to each other in a horizontal direction, the insulating gap between the first reed part $126_1$ and the extended part 131 can be sufficiently secured, and the reed switch 126 can be located above the extended part 31 enabling the reed switch unit 125 to be made compact. Moreover, the thermal stress occurring in the first and the second connecting terminals $129_1$, $129_2$ due to the heat generated when the first and the second reed parts $126_1$, $126_2$ are connected to the first and the second connecting terminals $129_1$, $129_2$ by fusing or soldering can be absorbed by the crank shaped bent portion to avoid the break-down of the reed switch 126.

Even in case where the distance between the first and the second connecting terminals $129_1$, $129_2$ is apt to change due to the expansion, shrinkage and deformation arising in the components of the reed switch unit 125, because the atmospheric temperature in an engine room, etc. of an automobile in which the reservoir tank R is installed, the above mentioned expansion, shrinkage and deformation can be absorbed by the crank shaped bent portion of the first and the second connecting terminals $129_1$, $129_2$, and the reed switch can be prevented from being damaged.

On the other hand, the switch receiving part 134 effectively serves to provide a stable support for the reed switch 126 and to insulate the switch 126 with respect to the extended part 131. In addition, the switch receiving part 134 can be easily molded together with the coupler part 133.

Again in FIGS. 11 and 12, the switch housing 115 in the reservoir tank R is in a form of a bottomed cylinder and isolated from the interior of the reservoir R. A mouth 115a of the switch housing 115 is enlarged in diameter, and formed with a locking hole 140 at an inner face thereof. When the reed switch unit 125 is inserted into the switch housing 115 guided by the T-shaped positioning piece 138 with the reed switch 126 directed upward, the reed switch unit 125 will be held at a regular position in which the reed switch 126 is faced with the before mentioned permanent magnet 123 through a contact of the positioning piece 138 with the inner peripheral wall of the switch housing 115 and an engagement of the locking claw 139 with the locking hole 140. At the same time, the sealing member 142 contacts an inner peripheral wall of the mouth 115a to seal the inside of the switch housing 115 for waterproofing and dustproofing.

Warning means such as a lamp or the like are connected to both the coupler terminals $128_1$, $128_2$ by connecting an outer coupler part (not shown) to the coupler part 133. When the brake liquid F in the reservoir tank R has decreased below the prescribed level to lower the float 121 accordingly, and the permanent magnet 123 gets close to the reed switch 126 in the switch housing 115, the reed switch 126 will be turned on by a magnetic force of the permanent magnet 123 and the warning means will be actuated. The driver can thus learn a situation that the brake liquid F in the reservoir tank R has decreased.

The invention is not limited to the above described embodiment, but may have various modifications within a scope not deviating from the concept of the invention. For example, the first and the second coupler terminals $128_1$, $128_2$ can be twisted at a right angle with respect to the first and the second mold connecting parts $130_1$, $130_2$.

Although the invention has been explained in detail referring to the preferred embodiment, it is apparent that the invention is not restricted to this embodiment only, but various modifications can be made within a scope which is not deviating from the spirit of the invention.

Further, in the specification, the embodiments are separately explained, of course it is possible to utilized both of the embodiments in a sole reed switch unit. At this time, operations and effects obtained by both embodiments can be simultaneously enjoyed.

According to the invention, the reed switch unit for detecting the liquid level in the reservoir of the master cylinder which comprises the reed switch including the contact part which is sealingly contained in the glass tube, and lead portions which axially extend from opposite ends of the glass tube, and the unit body provided with terminal members for respectively supporting the lead portions so as to be electrically connectable thereby to fix the reed switch is characterized in that the lead portions and the terminal members are connected with each other by means of the resistance welding.

By employing such construction, because the heat introducing time into the components to be connected will be shorter enabling the tact time to be shortened. Moreover, the thermal conduction to the glass tube can be decreased, thus avoiding an escape of the inert gas in the glass tube, and the quality will be enhanced as compared with the case where the lead portion and the terminal member are fixed by means of soldering. Because blurs of silicone or liquid on the faces to be connected need not be taken into consideration in conducting the welding, the work can be done without restricting the working environment.

Moreover, by conducting the resistance welding by fusing, different materials, that are, the high conductive material such as brass, copper, etc. of the terminal members, and the ferromagnetic material of the lead portions can be maintained in the mated state by means of the resiliences of the respective materials, because the terminal member is connected to the lead portion in such a manner that the terminal member embraces the lead portion.

As described above, according to the invention, in the reed switch unit for the reservoir tank which is contained in the switch housing formed in the reservoir tank in isolation from the interior thereof, the reed switch unit comprising the reed switch, the first and the second terminal members respectively having the first and the second connecting terminals adapted to be respectively connected to the first and the second reed parts of the reed switch and the first and the second coupler terminals at their respective opposite ends, and further having the first and the second mold connecting parts at their respective intermediate positions, and the coupler part which is formed of a synthetic resin and adapted to be connected to the first and the second mold connecting parts so as to receive the first and the second coupler terminals, the first and the second terminal members are constituted by a sheet of plate-like busbar having the connecting part which is cut and removed after the coupler part has been molded to block the connection between the first and the second terminal members, at least the first and the second mold connecting parts being positioned on the same horizontal plane, the first terminal member being provided with the first connecting terminal which is bent upward in a crank shape from the first mold connecting part and includes the connecting face which is higher in level than the mold connecting part, the second terminal member being provided with the extended part which horizontally extends from the second mold connecting part passing underneath the reed switch, and the second connecting terminal which is bent upward in a crank shape from the extended part in the same direction as the first connecting terminal and includes the connecting face positioned at substantially the same level as the connecting face of the first connecting terminal, the first and the second reed parts of the reed switch being connected to the connecting faces of the first and second connecting terminals.

Therefore, the first and the second terminal members can be easily connected to the coupler part keeping an accurate positional relation with respect to each other by employing the single plate-like busbar, and an improvement in its quality and productivity can be attained. Further, because the first and the second connecting terminals to which the first and the second reed parts of the reed switch are connected are held at higher levels than the first mold connecting part and the extended part, the insulating gap between the first reed part and the extended part can be sufficiently secured even though the first mold connecting part and the extended part are located relatively close to each other in a horizontal direction. Moreover, the reed switch can be arranged above the extended part whereby the reed switch unit can be made compact. When the first and the second reed parts are connected to the first and the second connecting terminals by fusing or soldering, the thermal stress occurring in the first and the second connecting terminals by heat generated on this occasion will be absorbed by the crank-shaped bent portion and a breakage of the reed switch can be avoided.

According to the invention, the above described coupler part is integrally formed with a switch receiving part which is formed of a synthetic resin and adapted to be connected to the extended part by molding thereby to support the reed switch. Therefore, the reed switch receiving part can provide a stable support for the reed switch and effective insulation of the reed switch with respect the extended part, and further, the switch receiving part can be easily molded together with the coupler part.

What is claimed is:

1. A switch unit for detecting a liquid level in a reservoir tank of a master cylinder which comprises:
   a reed switch including a contact part which is sealingly contained in a glass tube, said reed switch having lead portions which axially extend from opposite ends of said glass tube;
   a unit body provided with terminal members for respectively supporting said lead portions so as to be electrically connectable thereby to fix said reed switch, said terminal members having a connecting plane positioned between a carrying part and a facing bent piece, said lead portions rest on said carrying part and are grasped between said carrying part and said bent piece; and
   a resistance welded portion closing said connecting plane and connecting said lead portions and said terminal members with each other.

2. The switch unit as claimed in claim 1, wherein said resistance welding portion is formed by fusing.

3. The switch unit as claimed in claim 1, wherein said terminal members are U-shaped or V-shaped.

4. The switch unit as claimed in claim 1, further comprising a joint part between said facing bent piece and said carrying part.

5. The switch unit as claimed in claim 4, wherein said lead portions are adjacent to said joint part.

6. A switch unit for detecting a liquid level in a reservoir tank of a master cylinder which comprises:
   a reed switch including a contact part which is sealingly contained in a glass tube, said reed switch having lead portions which axially extend from opposite ends of said glass tube;
   a unit body provided with terminal members for respectively supporting said lead portions so as to be electrically connectable thereby to fix said reed switch; and
   a resistance welded portion for connecting said lead portions and said terminal members with each other,
   wherein said switch unit is contained in a switch housing formed in said reservoir tank in isolation from an interior thereof;
   wherein said terminal members comprises a first and a second terminal members respectively having;
      a first and a second connecting terminals adapted to be respectively connected to a first and a second reed parts of said reed switch,
      a first and a second coupler terminals at their respective opposite ends,
      a first and a second mold connecting parts at their respective intermediate positions,
      a coupler part which is formed of a synthetic resin and adapted to be connected to said first and second mold connecting parts so as to receive said first and second coupler terminals,
   wherein said first and second terminal members are constituted by a sheet of plate-like busbar having a connecting part which is adapted to be cut and removed after said coupler part has been molded to block a connection between said first and second terminal members, at least said first and second mold connecting parts being positioned on a same horizontal plane, said first terminal member being provided with said first connecting terminal which is bent upward in a crank shape from said first mold connecting part and includes a connecting face which is higher in level than said mold connecting part, said second terminal member being provided with an extended part which horizontally extends from said second mold connecting part passing underneath said reed switch, and said second connecting terminal which is bent upward in a crank shape from said extended part in the same direction as said first connecting terminal and includes a connecting face positioned at substantially the same level as said connecting face of said first connecting terminal, said first and second reed parts of said reed switch being connected to said connecting faces of said first and second connecting terminals.

7. A switch unit for a reservoir tank which is contained in a switch housing formed in said reservoir tank in isolation from an interior thereof, said reed switch unit comprising:
   a reed switch;
   a first and a second terminal members respectively having a first and a second connecting terminals adapted to be respectively connected to a first and a second reed parts of said reed switch and a first and a second coupler terminals at their respective opposite ends, and further having a first and a second mold connecting parts at their respective intermediate positions; and
   a coupler part which is formed of a synthetic resin and adapted to be connected to said first and second mold connecting parts so as to receive said first and second coupler terminals,
   wherein said first and second terminal members are constituted by a sheet of plate-like busbar having a connecting part which is adapted to be cut and removed after said coupler part has been molded to block a connection between said first and second terminal members, at least said first and second mold connecting parts being positioned on a same horizontal plane, said first terminal member being provided with said first connecting terminal which is bent upward in a crank shape from said first mold connecting part and includes a connecting face which is higher in level than said mold connecting part, said second terminal member being provided with an extended part which horizontally extends from said second mold connecting part passing underneath said reed switch, and said second connecting terminal which is bent upward in a crank shape from said extended part in the same direction as said first connecting terminal and includes a connecting face positioned at substantially the same level as said connecting face of said first connecting terminal, said first and second reed parts of said reed switch being connected to said connecting faces of said first and second connecting terminals.

8. The switch unit as claimed in claim 7, wherein said coupler part is integrally formed with a switch receiving part which is formed of a synthetic resin and adapted to be connected to said extended part by molding thereby to support said reed switch.

9. A switch unit for detecting a liquid level in a reservoir tank of a master cylinder which comprises:

a reed switch having lead portions which axially extend from opposite ends of a glass tube;

a unit body provided with terminal members for respectively supporting said lead portions so as to be electrically connectable thereby to fix said reed switch; and a resistance welded portion for connecting said lead portions and said terminal members with each other, wherein said terminal members comprises a first and a second terminal members respectively having a first and a second connecting terminals respectively connectable to a first and a second reed parts of said reed switch, a first and a second coupler terminals at their respective opposite ends, a first and a second mold connecting parts at their respective intermediate positions, a coupler part which is formed of a synthetic resin and connectable to said first and second mold connecting parts to receive said first and second coupler terminals, and a connecting plane positioned between a carring part and a facing bent piece, said lead portions rest on said carrying part and are grasped between said carrying part and said bent piece.

10. The switch unit as claimed in claim 9, wherein said first and second terminal members are made from a sheet of plate-like busbar having a connecting part which is adapted to be cut and removed after said coupler part has been molded to block a connection between said first and second terminal members.

11. The switch unit as claimed in claim 10, wherein at least said first and second mold connecting parts being positioned on a same horizontal plane.

12. The switch unit as claimed in claim 9, wherein said first terminal member being provided with said first connecting terminal which is bent upward in a crank shape from said first mold connecting part and includes a connecting face which is higher in level than said mold connecting part.

13. The switch unit as claimed in claim 12, wherein said second terminal member being provided with an extended part which horizontally extends from said second mold connecting part passing underneath said reed switch.

14. The switch unit as claimed in claim 12, wherein said second connecting terminal which is bent upward in a crank shape from said extended part in the same direction as said first connecting terminal and includes a connecting face positioned at substantially the same level as said connecting face of said first connecting terminal, said first and second reed parts of said reed switch being connected to said connecting faces of said first and second connecting terminals.

15. The switch unit as claimed in claim 9, wherein said first and the second terminal members are integrally connected with each other at said first and the second mold connecting parts by a connecting part.

* * * * *